(12) United States Patent
Paulsen et al.

(10) Patent No.: US 8,593,432 B2
(45) Date of Patent: Nov. 26, 2013

(54) SAMPLE AND HOLD ANALOG FRONT END FOR A CAPACITIVE TOUCHPAD

(75) Inventors: Keith L. Paulsen, Centerville, UT (US); Andrew Paulsen, Centerville, UT (US)

(73) Assignee: Cirque Corporation, Salt Lake City, UT (US)

(*) Notice: Subject to any disclaimer, the term of this patent is extended or adjusted under 35 U.S.C. 154(b) by 211 days.

(21) Appl. No.: 13/276,747

(22) Filed: Oct. 19, 2011

(65) Prior Publication Data

US 2012/0113049 A1    May 10, 2012

Related U.S. Application Data

(60) Provisional application No. 61/394,921, filed on Oct. 20, 2010.

(51) Int. Cl.
G06F 3/045    (2006.01)

(52) U.S. Cl.
USPC ...... 345/174; 345/173; 178/18.01; 178/18.06

(58) Field of Classification Search
USPC .............. 345/173, 174; 178/18.01–18.11
See application file for complete search history.

(56) References Cited

U.S. PATENT DOCUMENTS

| | | | |
|---|---|---|---|
| 5,189,417 A | | 2/1993 | Caldwell et al. |
| 2003/0193324 A1 | | 10/2003 | Male |
| 2008/0012832 A1 | | 1/2008 | Guanghai |
| 2008/0088594 A1 | | 4/2008 | Liu et al. |
| 2009/0002206 A1 | * | 1/2009 | Kremin .......................... 341/33 |
| 2011/0261006 A1 | * | 10/2011 | Joharapurkar et al. ....... 345/174 |

* cited by examiner

*Primary Examiner* — Koosha Sharifi-Tafreshi
(74) *Attorney, Agent, or Firm* — Morriss O'Bryant Compagni, PC

(57) ABSTRACT

A massively parallel capacitive touchpad architecture that enables the taking of simultaneous measurements that can be used to mathematically divide out and cancel the effect of the noise in one axis by isolating the noise to only the electrodes under or near the fingers being detected by using a sample and hold circuit that provides advantages over existing measurement circuits.

5 Claims, 6 Drawing Sheets

SC Module Schematic

Electrode I/O Module Schematic

FIG. 4

Analog Ground Module Schematic

SAMPLE AND HOLD ANALOG FRONT END FOR A CAPACITIVE TOUCHPAD

CROSS REFERENCE TO RELATED APPLICATIONS

This document claims priority to and incorporates by reference all of the subject matter included in the provisional patent application having Ser. No. 61/394,921, filed Oct. 20, 2010.

BACKGROUND OF THE INVENTION

1. Field of the Invention

This invention relates generally to touchpad technology. Specifically, the invention is related to the sensing system utilized by a capacitive touchpad using mutual capacitance technology to detect and track conductive objects in contact with and/or in proximity to the touchpad, wherein using massively parallel architecture uses simultaneous receive channels along an axis, when a multiple receive method provides two modes of operation.

2. Description of Related Art

Figure 1:
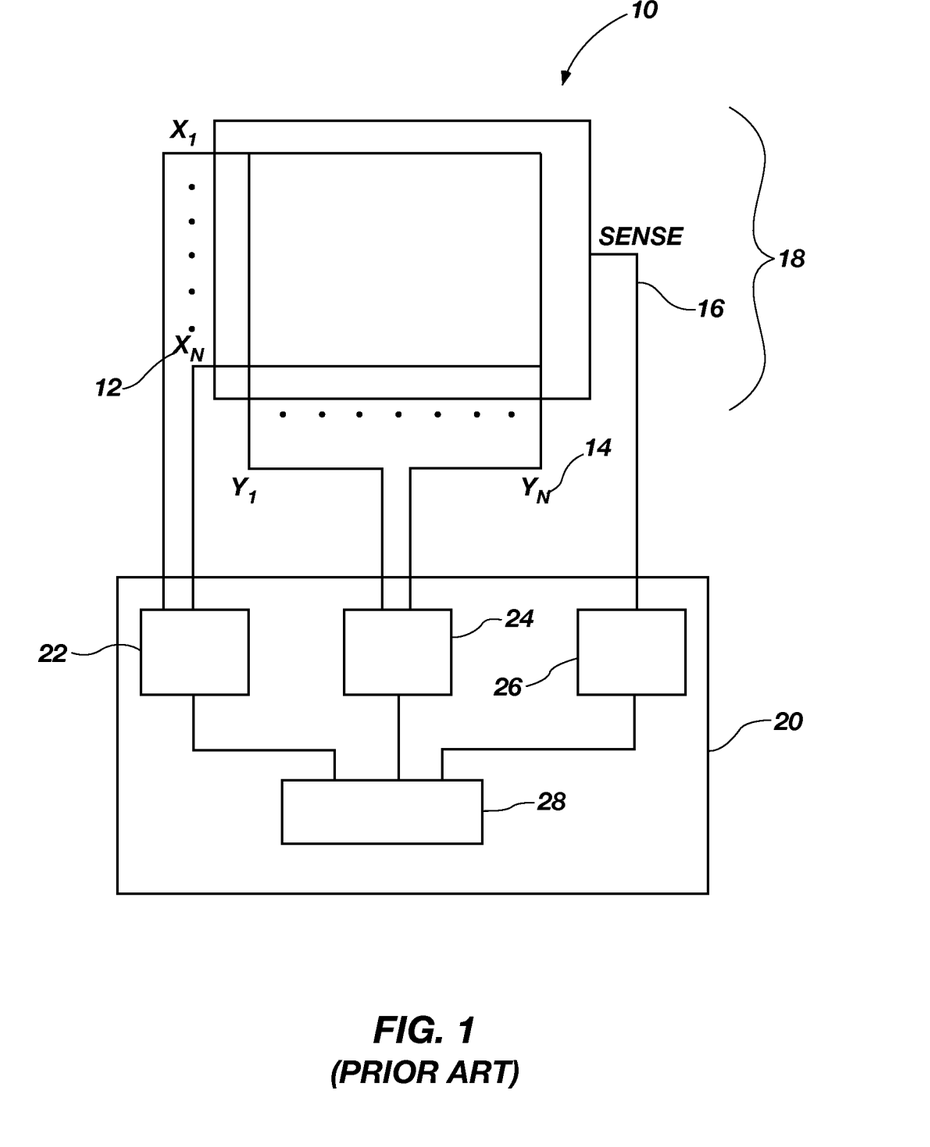
FIG. 1 is a prior art schematic diagram of a touchpad.

It is useful to describe one embodiment of touchpad and touchscreen technology that can be used in the present invention. Specifically, the capacitance-sensitive touchpad and touchscreen technology of CIRQUE® Corporation can be used to implement the present invention. The CIRQUE® Corporation touchpad is a mutual capacitance-sensing device and an example is illustrated in FIG. 1. The touchpad can be implemented using an opaque surface or using a transparent surface. Thus, the touchpad can be operated as a conventional touchpad or as a touch sensitive surface on a display screen, and thus as a touch screen.

In this touchpad technology of Cirque® Corporation, a grid of row and column electrodes is used to define the touch-sensitive area of the touchpad. Typically, the touchpad is a rectangular grid of approximately 16 by 12 electrodes, or 8 by 6 electrodes when there are space constraints. Interlaced with these row and column electrodes is a single sense electrode. All position measurements are made through the sense electrode. However, the row and column electrodes can also act as the sense electrode, so the important aspect is that at least one electrode is driving a signal, and another electrode is used for detection of a signal.

In more detail, FIG. 1 shows a capacitance sensitive touchpad 10 as taught by CIRQUE® Corporation includes a grid of row (12) and column (14) (or X and Y) electrodes in a touchpad electrode grid. All measurements of touchpad parameters are taken from a single sense electrode 16 also disposed on the touchpad electrode grid, and not from the X or Y electrodes 12, 14. No fixed reference point is used for measurements. Touchpad sensor control circuitry 20 generates signals from P,N generators 22, 24 positive and negative) that are sent directly to the X and Y electrodes 12, 14 in various patterns. Accordingly, there is typically a one-to-one correspondence between the number of electrodes on the touchpad electrode grid, and the number of drive pins on the touchpad sensor control circuitry 20. However, this arrangement can be modified using multiplexing of electrodes.

The touchpad 10 does not depend upon an absolute capacitive measurement to determine the location of a finger (or other capacitive object) on the touchpad surface. The touchpad 10 measures an imbalance in electrical charge to the sense line 16. When no pointing object is on the touchpad 10, the touchpad sensor control circuitry 20 is in a balanced state, and there is no signal on the sense line 16. There may or may not be a capacitive charge on the electrodes 12, 14. In the methodology of CIRQUE® Corporation, that is irrelevant. When a pointing device creates imbalance because of capacitive coupling, a change in capacitance occurs on the plurality of electrodes 12, 14 that comprise the touchpad electrode grid. What is measured is the change in capacitance, and not the absolute capacitance value on the electrodes 12, 14. The touchpad 10 determines the change in capacitance by measuring the amount of charge that must be injected onto the sense line 16 to reestablish or regain balance on the sense line.

The touchpad 10 must make two complete measurement cycles for the X electrodes 12 and for the Y electrodes 14 (four complete measurements) in order to determine the position of a pointing object such as a finger. The steps are as follows for both the X 12 and the Y 14 electrodes:

First, a group of electrodes (say a select group of the X electrodes 12) are driven with a first signal from P, N generator 22 and a first measurement using mutual capacitance measurement device 26 is taken to determine the location of the largest signal. However, it is not possible from this one measurement to know whether the finger is on one side or the other of the closest electrode to the largest signal.

Next, shifting by one electrode to one side of the closest electrode, the group of electrodes is again driven with a signal. In other words, the electrode immediately to the one side of the group is added, while the electrode on the opposite side of the original group is no longer driven.

Third, the new group of electrodes is driven and a second measurement is taken.

Finally, using an equation that compares the magnitude of the two signals measured, the location of the finger is determined.

Accordingly, the touchpad 10 measures a change in capacitance in order to determine the location of a finger. All of this hardware and the methodology described above assume that the touchpad sensor control circuitry 20 is directly driving the electrodes 12, 14 of the touchpad 10. Thus, for a typical 1.2×16 electrode grid touchpad, there are a total of 28 pins (12+16=28) available from the touchpad sensor control circuitry 20 that are used to drive the electrodes 12, 14 of the electrode grid.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes on the same rows and columns, and other factors that are not material to the present invention.

Although the CIRQUE® touchpad described above uses a grid of X and Y electrodes and a separate and single sense electrode, the sense electrode can also be the X or Y electrodes by using multiplexing. Either design will enable the present invention to function.

The method of using a single sense electrode has provided a very simple/low cost solution by requiring only a single Rx channel. The single sense line coming from a touchpad, however, creates measurements that are susceptible to noise even for measurement patterns not near a finger. The noise in the measurements for electrode patterns not near the finger cause the extraction method to falsely detect finger presses in random positions all over the touchpad surface which result in false positive gestures, cursor litter and gesture state machine mode confusion manifesting in unresponsive cursor movement.

It is desirable therefore to replace the single sense line electrode in favor of multiple sense electrodes along each axis while keeping cost as low as the current single sense electrode method.

BRIEF SUMMARY OF THE INVENTION

It is an object of the present invention to provide a massively parallel capacitive touchpad architecture that enables the taking of simultaneous measurements that can be used to mathematically divide out and cancel the effect of the noise in one axis by isolating the noise to only the electrodes under or near the fingers being detected by using a sample and hold circuit that provides advantages over existing measurement circuits.

These and other objects, features, advantages and alternative aspects of the present invention will become apparent to hose skilled in the art from a consideration of the following detailed description taken in combination with the accompanying drawings.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

The sample and hold analog front end (S/H AFE) system described herein is based on a massively parallel architecture utilizing simultaneous receive channels along an axis. Thus, FIGS. 2 and 3 all provide various massively parallel measurement circuits that all use a plurality of SC modules to measure the capacitance on each sense line of a touchpad.

The multiple receive method provides two modes of operation and several advantages over the current single sense electrode method. These advantages include low noise, low cost, more refined area gestures, field programmable firmware, and phased approach using off the shelf digital chip and test chips.

The multiple receive method isolates the noise to only the electrodes under or near the fingers. It also provides simultaneous measurements that can be used in the extraction calculation to mathematically divide out and cancel the effect of the noise in one axis as long as the noise is not equal to or larger than the signal.

The noise requirement of 10 v p-p single frequency noise and 10 v p-p uniformly distributed noise on the chassis and only 3 v p-p stimulus mandates additional filtering based on frequency and coherence in addition to simultaneous receive. This is accomplished using narrow aperture filtering, spread spectrum stimulus, and chassis isolation.

Figure 2:
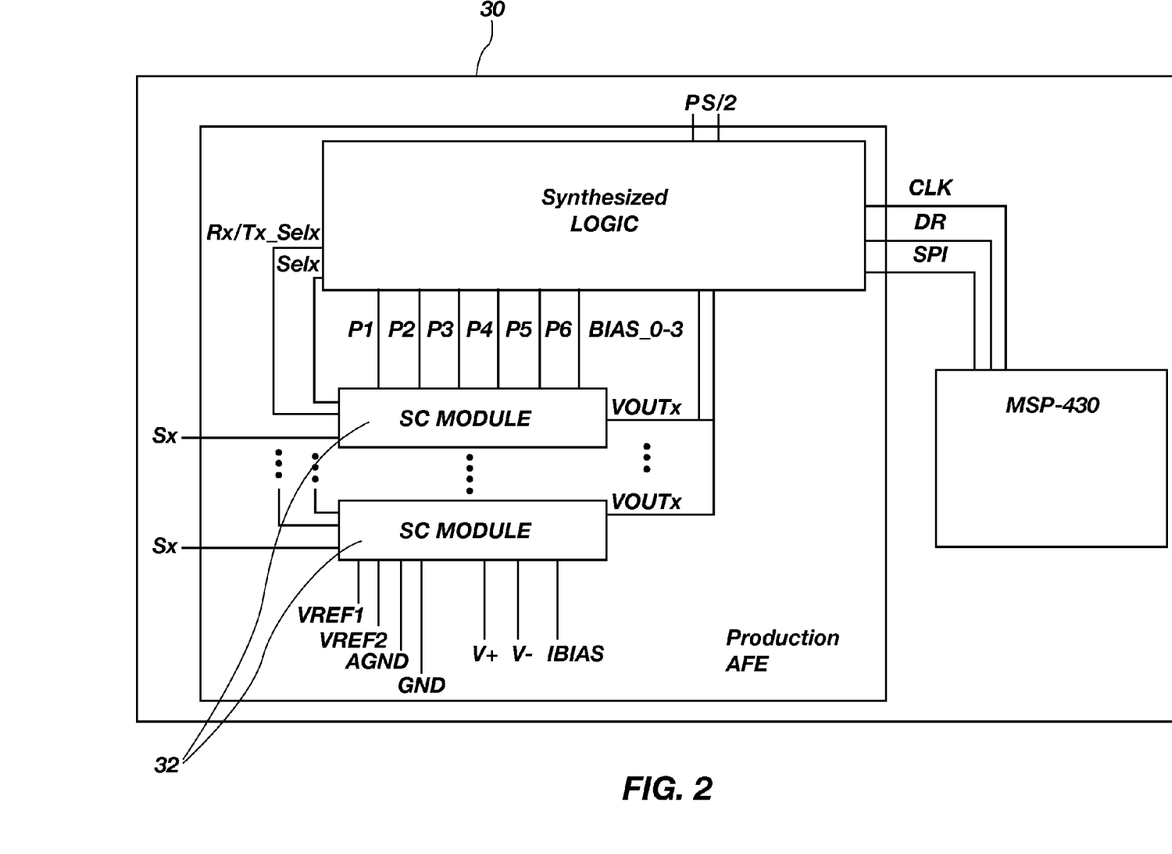
FIG. 2 is a schematic diagram of a two integrated circuit design to implement a first embodiment of the present invention in a touch d.
Figure 3:
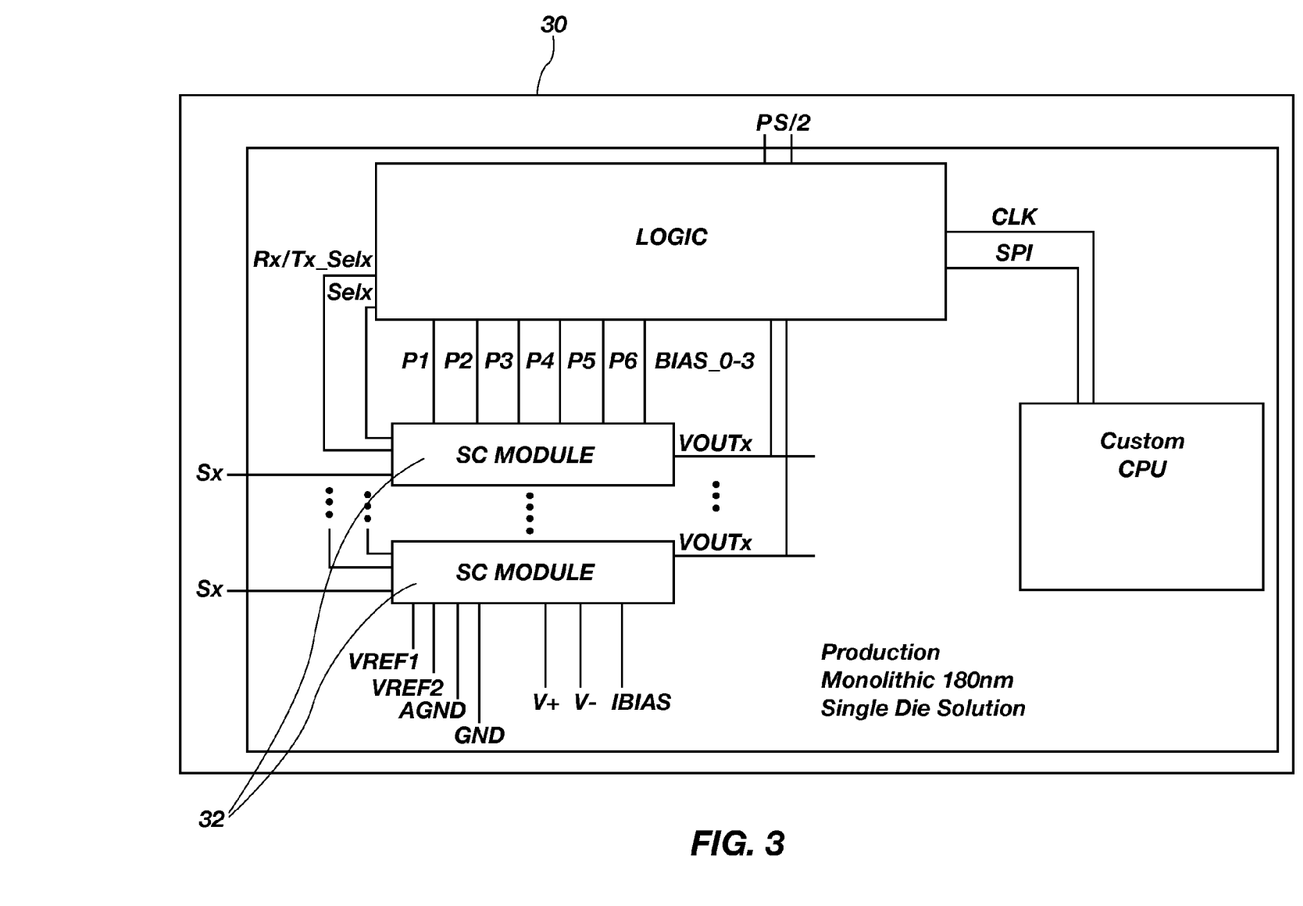
FIG. 3 is a schematic diagram of another embodiment of the present invention having a monolithic integrated circuit design implementation a touchpad.

The analog front end can be combined with an off-the-shelf programmable CPU chip with Flash Memory in one embodiment, or integrated into a single chip in another embodiment as shown in FIGS. 2 and 3.

A brief list of the specific S/H design techniques used to create the present invention include replacing a single sense line with multiple sense lines to thereby reduce false positive gestures, having extremely small footprint front-end SC Modules to support many Rx channels, using a very low power Integration Amplifier and long integration time, to reuse an Amplifier as a Comparator for tiny simultaneous Reverse Ramp ADC, narrow aperture sampling to perform matched noise filtering of step stimulus, simultaneous measurement on all, channels to cancel noise, spread spectrum stimulus to spread the effect of colored noise, and provide isolation from noisy chassis ground.

FIGS. 2 and 3 show various embodiments of touchpad measurement modules 30, with the common aspect of a single SC module 32 for each sense line on the touchpad (not shown). There are two basic modes of operation supported by the S/H AFE Design. The first mode is the SAR mode using the MSP430 circuit with a built-in SAR as shown in FIG. 2. The second is the CC mode which uses Verilog capture counters registers as shown in FIG. 3. In both modes of operation, the S/H AFE creates sample data by the Verilog logic processing through three phases or states of a state machine.

The Sample Phases used by the touchpad measurement module 30 of the present invention are 1) the RESET PHASE, 2) the ACQUISITION PHASE, and 3) the MEASUREMENT PHASE. In the SAR mode, S/H voltages are sampled using embedded SAR on a CPU chip as shown in FIG. 2. In contrast during the CC Mode shown in FIG. 3, S/H voltages are sampled using reverse ramp/capture registers.

The following Phase truth table can be used to move the state of the touch measurement module 30 through the three phases.

| Phase State Table | | | | | | |
|---|---|---|---|---|---|---|
| PHASE | P0 | P1 | P2 | P3 | P4 | P5 |
| RESET | 1 | 1 | 1 | 1 | 1 | 0 |
| ACQUISTION | ACT | ACT | ACT | ACT | 1 | 0 |
| MEASUREMENT | 1 | 1 | 0 | 0 | 0 | 1 |

Figure 4:
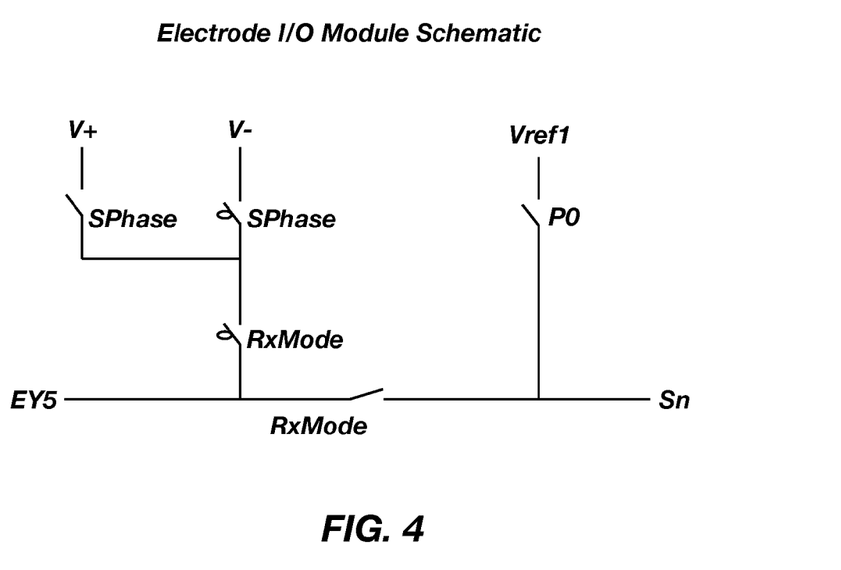
FIG. 4 is a circuit diagram of an electrode I/O module used in the present invention.
Figure 5:
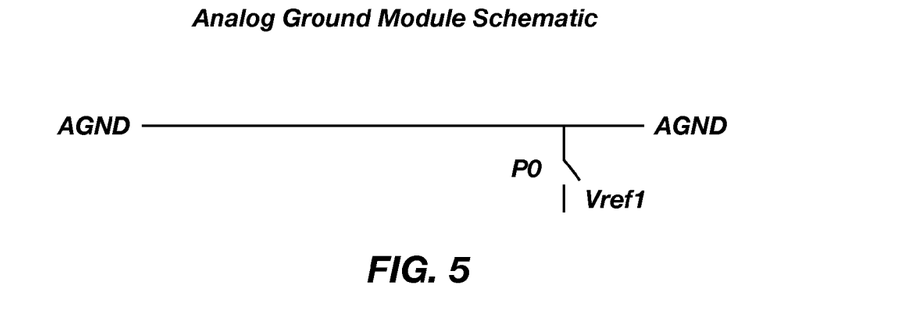
FIG. 5 is a circuit diagram of an analog ground module used in the present invention.
Figure 6:
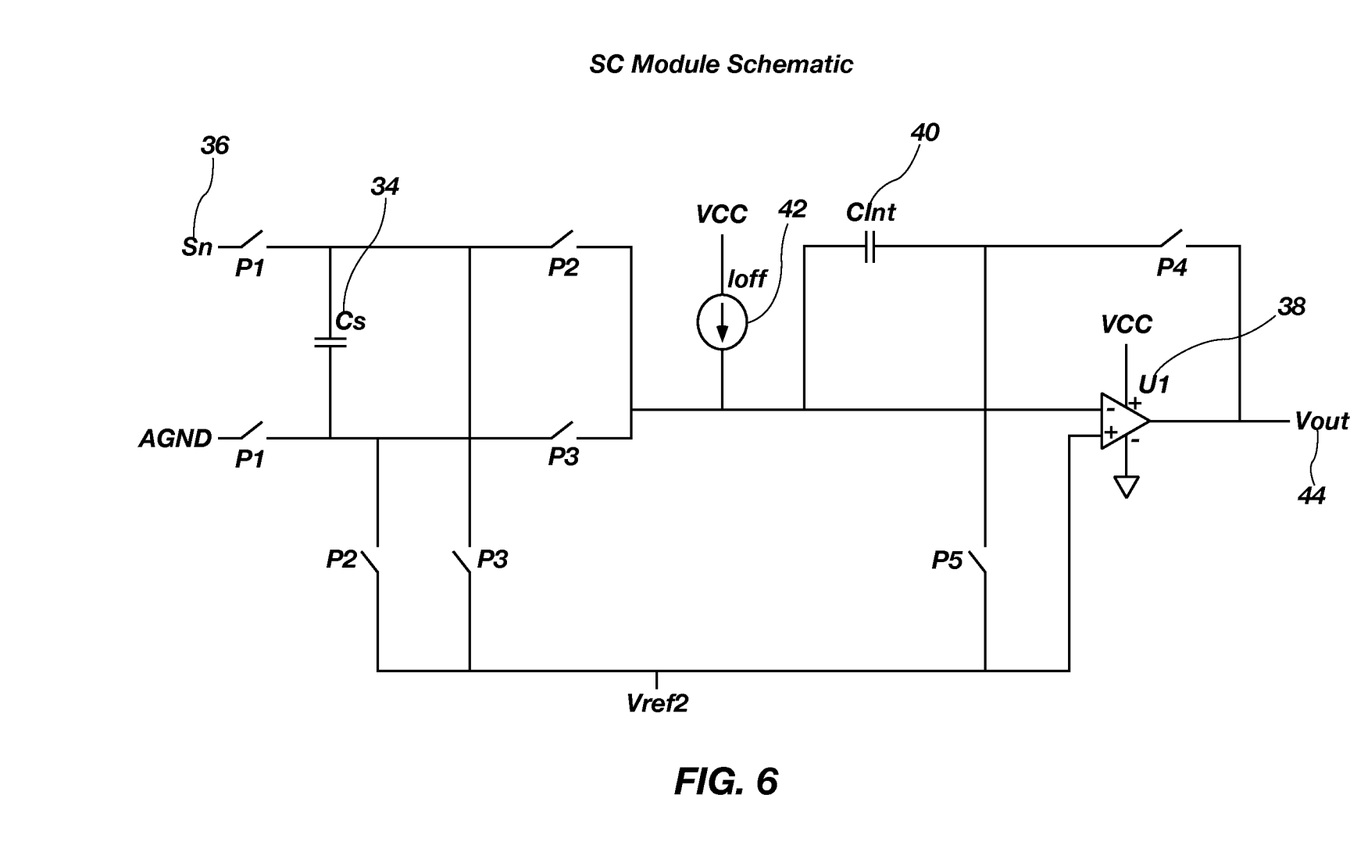
FIG. 6 is a preferred embodiment of a circuit for an SC module used in the present invention.

As shown in FIGS. 4 and 5, during the Reset Phase, all charge including residual charge on sense electrodes of a touchpad is discharged. Each sense electrode is discharged by connecting the sensor back plane to analog ground (AGND) and all sensor x/y electrodes EX (n) and EY(n) to Vref1 through large switches in the Electrode I/O Modules by asserting signal P0. The RESET PHASE also includes phase P1, wherein the internal Sample Capacitor Cs is discharged by asserting signal P1 which results in the closing of the switches PT as shown in FIG. 6. Likewise, switches P2, P3 and P4 are activated in phases P2, P3 and P4 for discharging Clot.

FIG. 6 shows important features of the present invention. FIG. 6 is a schematic diagram of the internal circuitry of an SC module 32. The various switches P1 through P5 are activated during the appropriate phase as defined by the Phase State Table above.

A first important aspect of the present invention is the implementation of the sample capacitor 34. The sample capacitor 34 integrates the charge on the sense line 36 that is coupled to the SC module 32 during the ACQUISITION PHASE.

During the ACQUISITION PHASE, stimulus is created on the touchpad using an isolated capacitor that is replaced with a wire and replenished between each cycle period. As shown in FIG. 4, this provides stimulus to the Tx electrodes of the touchpad via signal V+, Signal V−, and AGND in the Electrode I/O Module that is isolated from chassis ground (GND).

At each edge of stimulus the sample capacitor Cs 34 is applied across each Rx electrode by de-asserting P0 and asserting P1 for a very brief sample time or aperture window. This provides the desired matched frequency filtering with the stimulus.

During the ACQUISITION PHASE, the Op Amp U1 38 is configured as an integrator with CInt 40 by asserting signal P4 and opening signal P5 and alternately asserting signal P2 and signal P3. Signal P2 is asserted after capturing positive stimulus transitions on Cs 34 and P3 is asserted after capturing negative stimulus transitions on Cs and providing the necessary synchronous rectification. In this way, charge is always added to Cs 34 even if the charge on Cs is negative.

Figure 7:
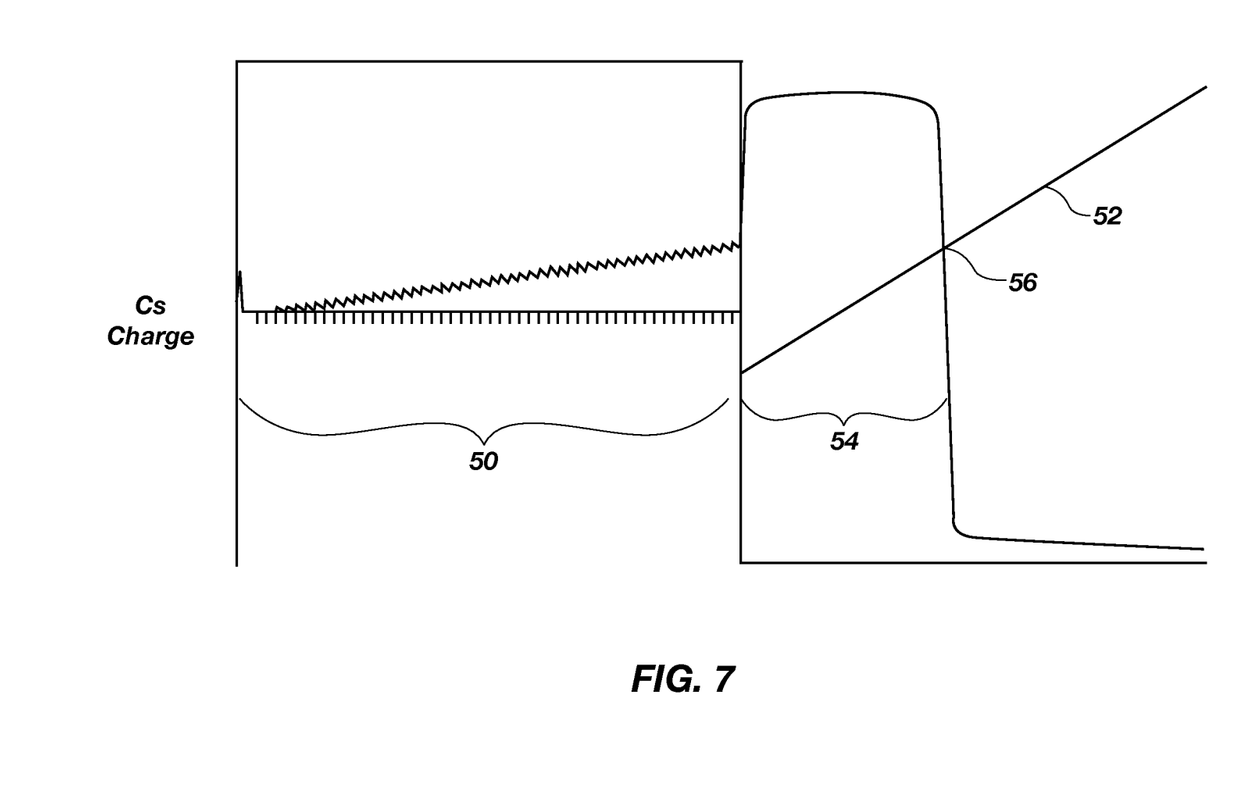
FIG. 7 is Example Output Waveform using Capture Counter Mode.

Referring to FIG. 7, during the ACQUISITION PHASE, the charge is shown to be incrementally increasing on sample capacitor Cs 34 during time 50. Then during the MEASUREMENT PHASE, the charge on Cint 40 is shown to be increasing as shown by the linear ramp 52 because of the constant current coming from Ioaf 42. When the charge on Cint 40 matches the charge on Cs 34 at time 56, the time 54 that it took for the charges to be equal is then known and Vout 44 toggles.

The Integrator Op Amp 38 captures charge collected on the sample capacitor Cs 34 over the remaining half period of the stimulus. This allows for a very small footprint, to power Op Amp to be used. Ioff 42 continuously provides a constant current set by the logic block. This current provides a mechanism to dynamically offset parasitic amounts of capacitance and also allow for a very small value for CInt 40. The cycle is then repeated a configurable number of stimulus cycles.

During the MEASUREMENT PHASE there can be two modes of operation. The following is a description of the SAR mode. During the MEASUREMENT PHASE the MSP430 CPU of FIG. 2 successively measures each Vout (n) voltage using an embedded SAR ADC. The duration of the measurement phase using the SAR mode depends on the number of RxChannels.

Alternatively, the CC mode can be used during the MEASUREMENT PHASE. During the MEASUREMENT PHASE the sense lines 36 and sample capacitor Cs 34 are all held at Vref1 by asserting signal P0 and signal P1. Signals P2, P3 and P4 are de-asserted and signal P5 is asserted. Advantageously, the Op Amp 38 is thus reconfigured to function as a Comparator instead of an Integrator. Ioff 42 provides a configurable amount of constant current through CInt 40 producing a linear ramp in voltage across CInt.

The Comparator 38 output Vout 44 becomes a digital output monitored by the logic block Vout(n) 44 is de-asserted once the charge on Clot 40 is depleted. The logic block captures the length of time it takes to deplete CInt 40 in an internal Capture Compare Register for each CS Module.

The duration of the MEASUREMENT PHASE is determined by the desired bit resolution of the capture registers. There is no penalty in sample rate for more channels. 10 bit measurements require a MEASUREMENT PHASE of 52 us using a 25 MHz clock regardless of the number of Rx channels sampled.

The following paragraphs define terms shown in FIGS. 2-7. When values are given they are for illustration purposes only and can be modified. Global S/H Signals are: VCC—3V power supply, GND—Chassis ground, Vref1—1.5V, Vref2—1.5V may be connected to Vref1, AGND—Analog ground supports isolated ground plane behind x/y sensor, V+—3V Stimulus approximate 500 KHz square wave, V−—3V Stimulus that is 180 degrees delayed from V+, VBias—Current mirror VGS bias voltage to supply programmable offset, P0—Aperture window signal, P1—Aperture window signal—no-overlapped with P0, P2—Positive integration phase signal—non-overlapped with P1, P3, P3—Negative integration phase signal—non-overlapped with P1, P2, P4—Acquisition phase signal, P5—Measurement phase signal—non-overlapped with P4, and Rext pin—used for setting global VGS for created individual. Ioff currents.

In the SC Module Signals, there are 16 total SC Modules. The terms to define include: Vout(n)—Analog/Digital S/H module output signal, and S(n)—Connected to two each Electrode I/O Modules, ie. S0-EX0-EY0.

In the Electrode I/O. Module of FIG. 4, there are 32 total Electrode I/O Modules. The terms to define include: Exy (n)—Electrode Pin signal, SPhase(n)—Select in-phase or differential phase stimulus signal, and RxMode(n)—Select as Rx channel or Tx channel signal.

It is noted that in FIGS. 4-6, SPhase and RxMode are single NMOS and PHOS transistors (W=3.50, L=0.35) near 10 pad—small circle on gate symbol indicates PHOS. All "Px" gates are single unity NMOS transistors (W=0.35, L=0.35). Each pair of X and Y electrodes share a single SC. Module (i.e. EX0 and EY0 share signal S0).

It should be understood that while the specification is directed to a touchpad, the same principles apply to a touch panel that is operating using capacitive measurements to detect objects on a surface thereof.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for measuring the charge on a sense line of a capacitive touchpad using a sample and hold measurement circuit, said method comprising the steps of:
   1) providing a sample and hold measurement circuit including a sample capacitor for integrating charge, an Op Amp that functions as an Integrator and a Comparator, and an integrating capacitor for operating with the Op Amp;
   2) discharging all charge on the sample capacitor during a RESET PHASE;
   3) coupling a sense line from a touchpad to the sample capacitor;
   4) integrating charge from the sense line to the sample capacitor during an ACQUISITION PHASE;

5) adding charge to the integrating capacitor during a MEASUREMENT PHASE until the charge on the integrating capacitor is equal to the charge on sample capacitor; and 6) toggling an output of the Op Amp.

2. The method as defined in claim 1 wherein the method further comprises the step of designating the charge on the sense line to correspond to the time it takes for the charge on the integrating capacitor to equal the charge on the sample capacitor in the MEASUREMENT PHASE.

3. The method as defined in claim 1 wherein the method further comprises the step of operating the Op Amp as an Integrator during the ACQUISITION PHASE and operating the Op Amp as a Comparator during the MEASUREMENT PHASE.

4. The method as defined in claim 1 wherein the method further comprises the step of providing a plurality of switches such that the sample and hold measurement circuit rectifies the charges being integrated on the sample capacitor during the ACQUISITION PHASE.

5. A sample and hold measurement circuit for measuring charge on a sense line, said measurement circuit comprised of:
a sample capacitor for integrating charge;
an Op Amp that functions as an Integrator and a Comparator;
an integrating capacitor for operating with the Op Amp;
a constant current source for providing charge to the integrating capacitor; and
wherein the sample capacitor and integrating capacitor are discharged during a RESET PHASE, wherein a sense line is coupled to the sampling capacitor, wherein charge is integrated from the sense line to the sample capacitor during an ACQUISITION PHASE, wherein the constant current source adds charge to the integrating capacitor during a MEASUREMENT PHASE until the charge is the same as the charge on the sample capacitor, and wherein an output of the Op Amp is toggled to indicate that the charges are equal.

\* \* \* \* \*